US012679091B2

(12) United States Patent
Tamai et al.

(10) Patent No.: US 12,679,091 B2
(45) Date of Patent: Jul. 14, 2026

(54) LIQUID EJECTING HEAD AND MANUFACTURING METHOD

(71) Applicant: SEIKO EPSON CORPORATION, Tokyo (JP)

(72) Inventors: Shotaro Tamai, Matsumoto (JP); Sosuke Yamasaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/611,376

(22) Filed: Mar. 20, 2024

(65) Prior Publication Data

US 2024/0316930 A1 Sep. 26, 2024

(30) Foreign Application Priority Data

Mar. 22, 2023 (JP) ................................ 2023-044870

(51) Int. Cl.
*B41J 2/14* (2006.01)
*B41J 2/16* (2006.01)

(52) U.S. Cl.
CPC .......... *B41J 2/14233* (2013.01); *B41J 2/161* (2013.01); *B41J 2/1623* (2013.01)

(58) Field of Classification Search
CPC ...... B41J 2/14233; B41J 2/161; B41J 2/1623; B41J 2/1626; B41J 2002/14241; B41J 2202/11
See application file for complete search history.

(56) References Cited

U.S. PATENT DOCUMENTS

2014/0362142 A1* 12/2014 Takaai ................ B41J 2/14201 347/71
2017/0113462 A1 4/2017 Takahashi

FOREIGN PATENT DOCUMENTS

JP 2017-080946 A 5/2017

* cited by examiner

*Primary Examiner* — Lisa Solomon
(74) *Attorney, Agent, or Firm* — WORKMAN NYDEGGER

(57) ABSTRACT

In a liquid ejecting head, a flow channel substrate and a pressure chamber substrate are bonded by an adhesive. The pressure chamber substrate includes a first opening formed exposing at least a portion of a diaphragm to a pressure chamber space, a second opening coupling the pressure chamber space to a flow channel formed in the flow channel substrate, at least one wall portion being an inner wall portion partitioning the pressure chamber space and coupling the first opening to the second opening, at least one recess portion formed on the wall portion and recessed in a first direction from the flow channel substrate to the diaphragm, and at least one protruding portion formed on the wall portion and protruding in a direction opposite to the first direction, the protruding portion being disposed between the at least one recess portion and the first opening in a longitudinal direction.

14 Claims, 9 Drawing Sheets

LIQUID EJECTING HEAD AND MANUFACTURING METHOD

The present application is based on, and claims priority from JP Application Serial Number 2023-044870, filed Mar. 22, 2023, the disclosure of which is hereby incorporated by reference herein in its entirety.

BACKGROUND

1. Technical Field

The present disclosure relates to a liquid ejecting head and a manufacturing method.

2. Related Art

JP-A-2017-80946 describes a technique for suppressing occurrence of cracks or other damage to a diaphragm that seals one opening surface of a pressure chamber in an ejecting head of a liquid ejecting apparatus.

Specifically, a recess portion having an area larger than an opening area of the pressure chamber is formed on a surface of the diaphragm on a pressure chamber substrate side. With the diaphragm and the pressure chamber substrate stacked, a notch is formed in a portion of the recess portion formed on the surface of the diaphragm on the pressure chamber substrate side that overlaps a partition wall that partitions the pressure chamber in the pressure chamber substrate. The notch is formed at a periphery of a flexible region in the diaphragm. A portion of adhesive that bonds a communicating substrate to the pressure chamber substrate flows through an inner wall of the pressure chamber and hardens in the notch. In this way, the periphery of the flexible region of the diaphragm is reinforced by the adhesive.

In the technology described in JP-A-2017-80946, the adhesive may reach the flexible region of the diaphragm as well as the periphery of the flexible region of the diaphragm. If the adhesive adheres to the flexible region of the diaphragm and hardens, the flexible region of the diaphragm cannot flex sufficiently during liquid ejecting, resulting in a decrease in liquid ejecting characteristics. Variation in the amount of adhesive adhering to the flexible region of the diaphragm causes variation in the liquid ejecting characteristics of each pressure chamber. As a result, there has been a problem in that variation in the image quality of each liquid ejecting apparatus occurs.

SUMMARY

According to a first aspect of the present disclosure, a liquid ejecting head is provided. This liquid ejecting head includes a flow channel substrate having at least one space forming a flow channel guiding liquid to a nozzle, a pressure chamber substrate having a pressure chamber space coupled to the space of the flow channel substrate, a diaphragm disposed at a position overlapping the pressure chamber space, and a piezoelectric element that vibrates the diaphragm to apply pressure to the liquid inside the pressure chamber space. The flow channel substrate, the pressure chamber substrate, the diaphragm, and the piezoelectric element are stacked in this order. The flow channel substrate and the pressure chamber substrate are bonded by using an adhesive. The pressure chamber substrate includes a first opening formed in a surface on a diaphragm side and exposing at least a portion of the diaphragm to the pressure chamber space, a second opening formed in a surface on a flow channel substrate side, and coupling the pressure chamber space to the flow channel formed in the flow channel substrate, at least one wall portion being an inner wall portion partitioning the pressure chamber space and coupling the first opening to the second opening, at least one recess portion formed on the at least one wall portion and recessed in a first direction from the flow channel substrate to the diaphragm, and at least one protruding portion formed on the at least one wall portion and protruding in a direction opposite to the first direction, the protruding portion being disposed between the at least one recess portion and the first opening in a longitudinal direction of the pressure chamber space when the pressure chamber space is viewed in a section cut in a plane parallel to the longitudinal direction and a stacking direction.

According to a second aspect of the present disclosure, a method for manufacturing a piezoelectric device is provided. A first substrate, a second substrate, a diaphragm, and a piezoelectric element are stacked in this order in the piezoelectric device. The manufacturing method includes a step of depositing a flexible film as the diaphragm on one side of the second substrate, a step of forming the piezoelectric element on the flexible film, a step of forming a space in the second substrate, the step including forming a first opening located on the one side of the second substrate, a second opening located on the other side of the second substrate, and a wall portion coupling the first opening to the second opening, the wall portion including at least one recess portion and at least one protruding portion located farther than the at least one recess portion from the second opening, and a step of bonding, by using an adhesive, the first substrate at the other side of the second substrate disposed with the second opening up.

DESCRIPTION OF EMBODIMENTS

A. Embodiment

Figure 1:
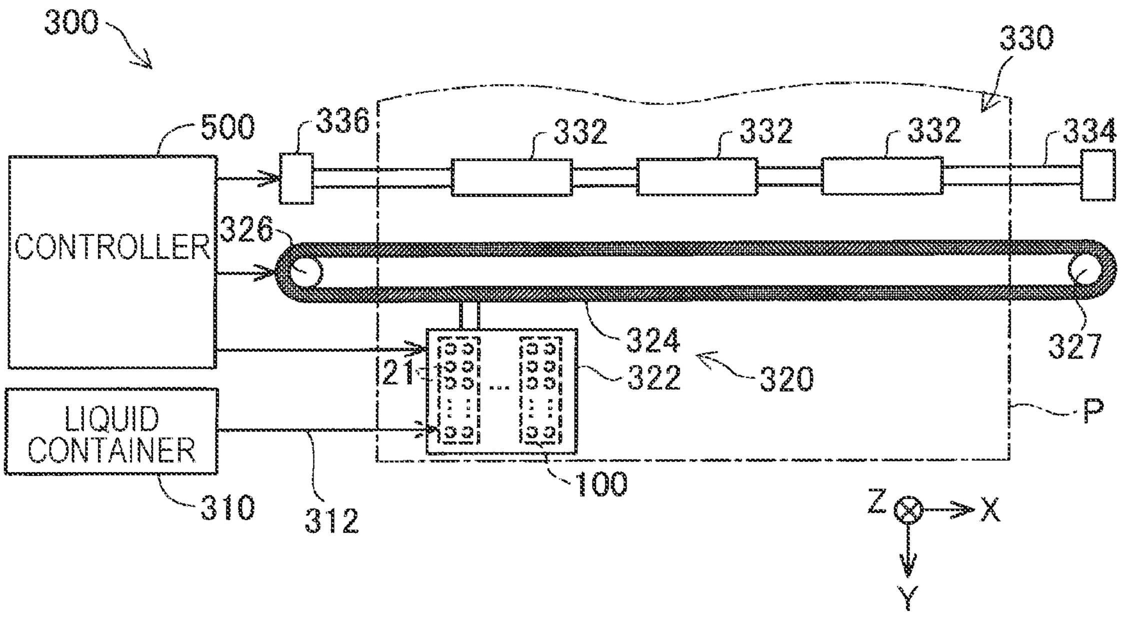
FIG. 1 is a schematic diagram illustrating a configuration of a liquid ejecting apparatus.

FIG. 1 is a schematic diagram illustrating a configuration of a liquid ejecting apparatus 300 including a liquid ejecting head 100. In FIG. 1, the XYZ orthogonal coordinate system is set for ease of understanding. X- and Y-axes are along the horizontal plane, and a Z-axis is along the vertical direction.

Such axis definitions depend on the direction in which the liquid ejecting apparatus 300 is disposed. Orthogonal means a range of 90°±10°. The XYZ orthogonal coordinate system is set in the same way in FIG. 2 and subsequent drawings.

The liquid ejecting apparatus 300 is an ink jet printer that ejects ink as an example of liquid to print images on printing paper P serving as a medium. The medium onto which the liquid ejecting apparatus 300 ejects liquid may be plastic, film, fiber, fabric, leather, metal, glass, wood, ceramics, etc., rather than the printing paper P.

The liquid ejecting apparatus 300 includes a liquid ejecting head 100 that ejects liquid, a liquid container 310, a head moving mechanism 320, a transporting mechanism 330, and a controller 500.

The liquid ejecting head 100 has a plurality of nozzles 21 for ejecting liquid and ejects liquid supplied from the liquid container 310 onto the printing paper P. The plurality of nozzles 21 are arranged along the Y-axis direction. The liquid container 310 reserves the liquid to be ejected from the liquid ejecting head 100. The liquid reserved in the liquid container 310 is supplied to the liquid ejecting head 100 via a plastic tube 312. The liquid container 310 is, for example, a bag-shaped liquid pack made of flexible film.

The head moving mechanism 320 has a carriage 322 on which the liquid ejecting head 100 is mounted, a driving belt 324 to which the carriage 322 is fixed, and a moving motor 326 and a pulley 327 for moving the driving belt 324 back and forth in a main scanning direction. The moving motor 326 moves the driving belt 324 back and forth in the main scanning direction, causing the carriage 322 and the liquid ejecting head 100 to move back and forth in the main scanning direction. The main scanning directions are the +X and −X directions. Sub-scanning directions are the +Y and −Y directions, which intersect the main scanning direction. In an illustrated example, liquid is ejected from nozzle 21 in the +Z direction.

The transporting mechanism 330 has three transporting rollers 332, a transporting rod 334 to which the transporting rollers 332 are attached, and a transporting motor 336. The transporting motor 336 rotates and drives the transporting rod 334 to transport the printing paper P in the sub-scanning direction.

The controller 500 is a computer including a CPU and memory and controls the entire liquid ejecting apparatus 300. For example, the controller 500 controls reciprocating movement of the carriage 322 along the main scanning direction, transportation movement of the printing paper P along the sub-scanning direction, and ejecting movement of the liquid ejecting head 100.

Figure 2:
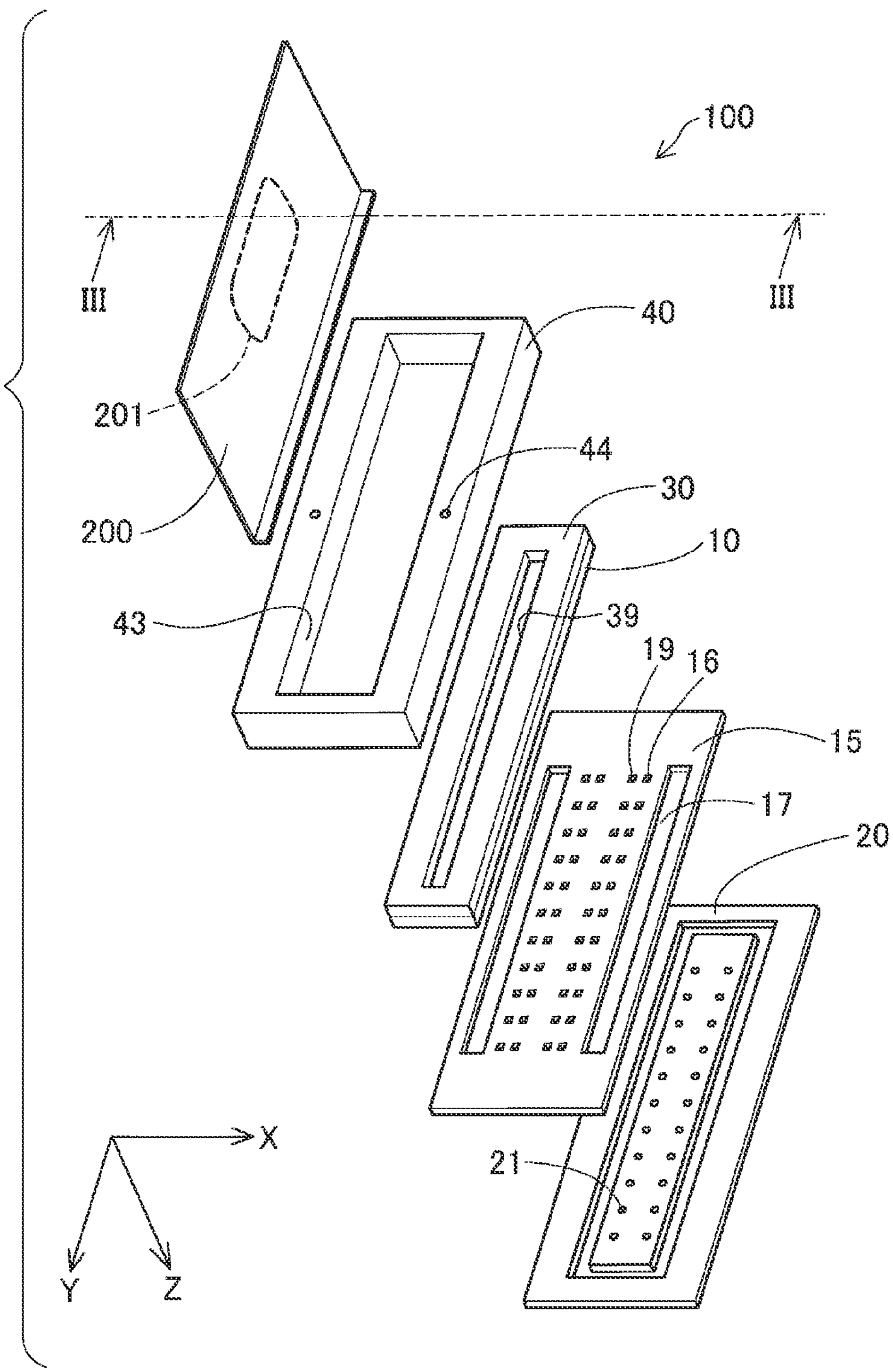
FIG. 2 is an exploded perspective view illustrating a configuration of a liquid ejecting head.
Figure 3:
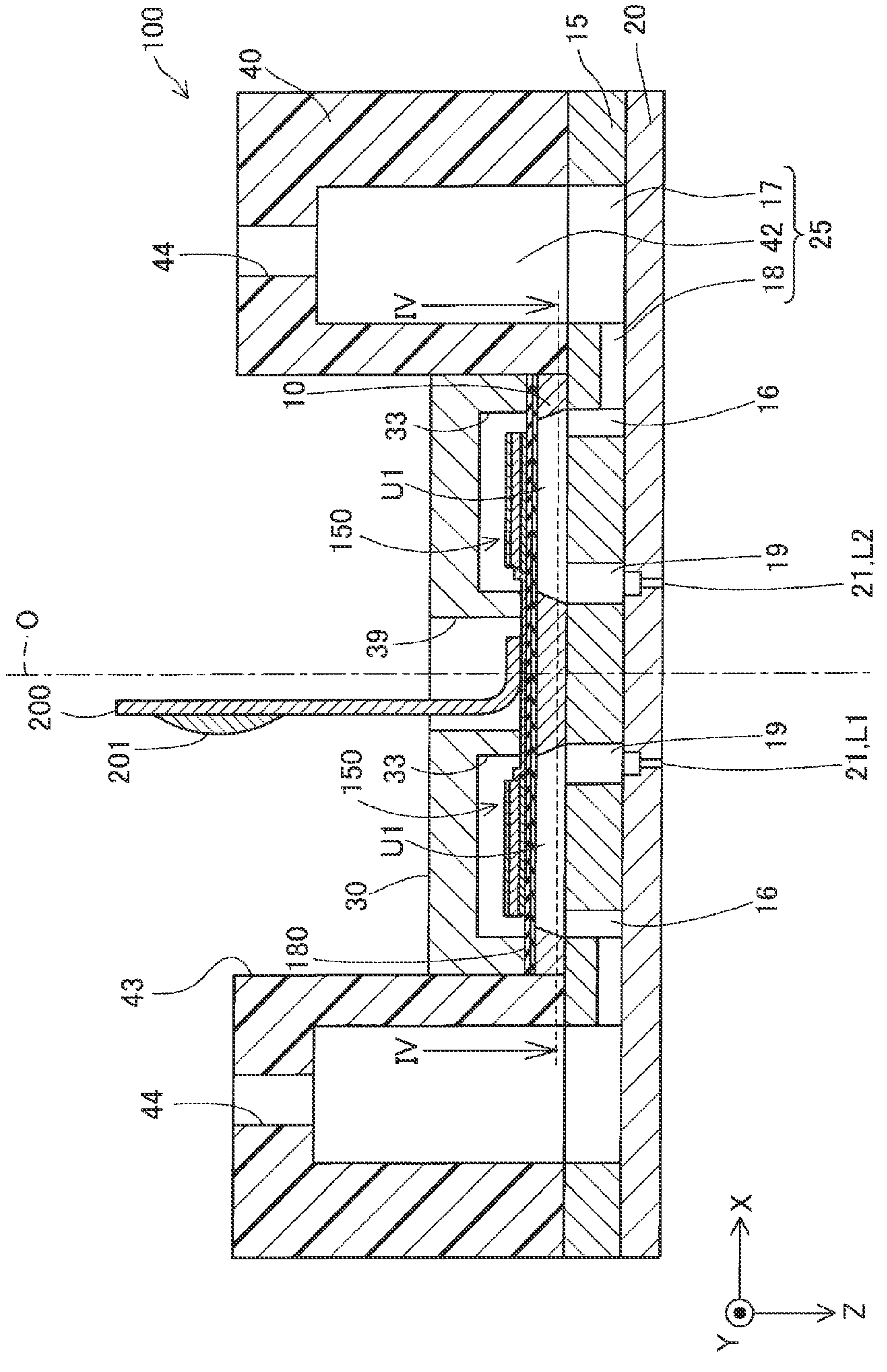
FIG. 3 is a sectional view of the liquid ejecting head taken along line III-III in FIG. 2.

FIG. 2 is an exploded perspective view illustrating a configuration of the liquid ejecting head 100. FIG. 3 is a sectional view of the liquid ejecting head 100 taken along line III-III in FIG. 2. In FIG. 3, a virtual center plane O is set for convenience of explanation. The center plane O is a plane parallel to the Y-axis and Z-axis and equal in distance to the nozzle rows L1 and L2. The nozzle row L1 includes a plurality of nozzles 21 arranged along the Y-axis direction. The nozzle row L2 is similar to L1. The configurations of a head body and a case member 40 of the liquid ejecting head 100 are common in the +X and −X directions with respect to the center plane O.

As illustrated in FIGS. 2 and 3, the liquid ejecting head 100 includes a pressure chamber substrate 10, a communicating substrate 15, a nozzle substrate 20, a protective substrate 30, the case member 40, an actuator 150, a diaphragm 180, and a wiring substrate 200. These stacked members are stacked to form the liquid ejecting head 100. The direction in which the stacked members forming the liquid ejecting head 100 are stacked is also referred to as a stacking direction. In this embodiment, the stacking direction corresponds to the Z-axis direction. The side in the +Z direction is also referred to as "bottom side" and the side in the −Z direction is also referred to as "top side" with respect to the predetermined reference position.

The pressure chamber substrate 10 is fixed to the upper side of the communicating substrate 15 by using an adhesive. The pressure chamber substrate 10 is formed of a silicon single-crystal substrate. Alternatively, the pressure chamber substrate 10 may be made of, for example, metals such as stainless steel (SUS) and nickel (Ni), ceramic materials such as zirconia ($ZrO_2$) and alumina ($Al_2O_3$), glass ceramic materials, and oxide materials such as magnesium oxide (MgO) and lanthanum aluminate ($LaAlO_3$). Dedicated flow channels U1 corresponding to the respective nozzles 21 are formed in the pressure chamber substrate 10. Liquid flows into the dedicated flow channels U1 from ink supply channels 16 formed in the communicating substrate 15.

Figure 4:
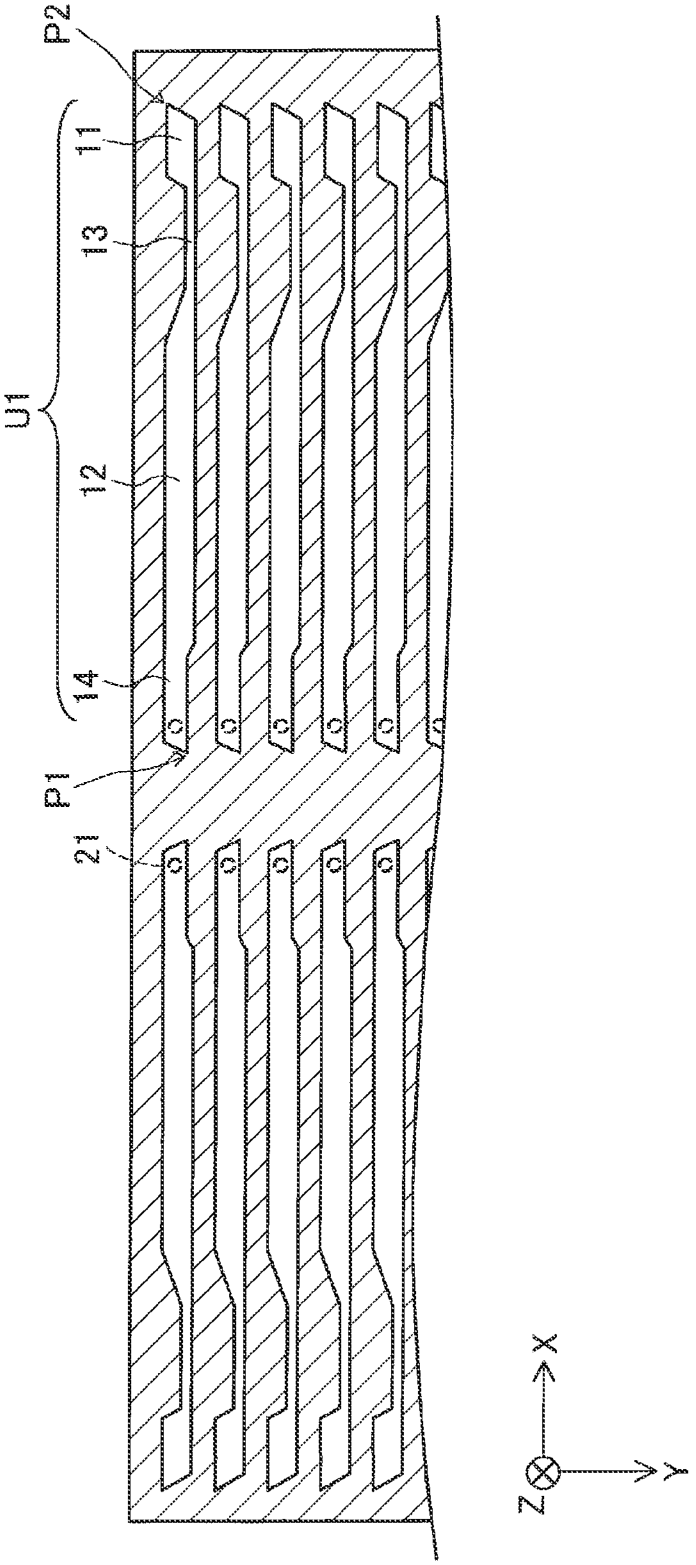
FIG. 4 is a sectional view of the liquid ejecting head taken along line IV-IV in FIG. 3.

FIG. 4 is a sectional view of the liquid ejecting head taken along line IV-IV in FIG. 3. In FIG. 4, the case member 40 is omitted. In FIG. 4, the position of nozzle 21 is indicated by a dashed line. The dedicated flow channel U1 includes a first communicating flow channel 11, a pressure chamber 12, an introduction channel 13, and a second communicating flow channel 14. The liquid flowing from the ink supply channel 16 passes through the first communicating flow channel 11, the introduction channel 13, the pressure chamber 12, and the second communicating flow channel 14 in this order. In plan view, the dedicated flow channel U1 is formed in a substantially parallelogram shape with a neck having the length in the X-axis direction being longer than the length in the Y-axis direction. In this specification, "plan view" means the state in which the object is viewed along the stacking direction. The shape of the dedicated flow channel U1 in plan view is not limited to the example illustrated in FIG. 4.

The first communicating flow channel 11 is a flow channel provided upstream of the pressure chamber 12 and the introduction channel 13. Liquid flowing from the ink supply channel 16 that will be described below passes through the first communicating flow channel 11 and flows into the introduction channel 13. A plurality of pressure chambers 12 are arranged along the Y-axis direction so as to individually correspond to a plurality of nozzles 21. The pressure chambers 12 are spaces for applying pressure to liquid by the actuator 150 being driven.

The introduction channel 13 is a flow channel provided upstream of the pressure chamber 12. The introduction channel 13 couples the first communicating flow channel 11 to the pressure chamber 12. The length of the introduction channel 13 in a lateral direction (Y-axis direction), that is, the width, is less than the length of the pressure chamber 12 in the Y-axis direction. By narrowing the flow channel of the introduction channel 13, backflow of liquid in the pressure chamber 12 into a common liquid chamber portion formed of a first common liquid chamber 17, a second common liquid chamber 18, and a liquid chamber portion 42, which will be described below, is suppressed from occurring. The second communicating flow channel 14 is a flow channel provided downstream of the pressure chamber 12. Liquid that has passed through the pressure chamber 12 flows through the second communicating flow channel 14 and into a nozzle communicating port 19 that will be described later. The details of the internal geometry of the dedicated flow channel U1 in this embodiment will be described below.

The communicating substrate 15 is fixed to the upper side of the nozzle substrate 20 by using an adhesive, as illustrated in FIG. 2. The communicating substrate 15 is formed of, for example, a silicon single-crystal substrate.

As illustrated in FIG. 3, the ink supply channel 16, the first common liquid chamber 17, the second common liquid chamber 18, and the nozzle communicating port 19 are formed in the communicating substrate 15. The communicating substrate 15 is also referred to as a flow channel substrate. The ink supply channel 16 is a through hole extending through the communicating substrate 15 in the Z-axis direction and couples the second common liquid chamber 18 to the dedicated flow channel U1 formed in the pressure chamber substrate 10. The ink supply channel 16 is a flow channel that introduces liquid into the dedicated flow channel U1. The first common liquid chamber 17 is formed as a through hole extending through the communicating substrate 15 in the Z-axis direction. The second common liquid chamber 18 is formed as a recess portion provided in the lower surface of the communicating substrate 15. The first common liquid chamber 17 and the second common liquid chamber 18, together with the liquid chamber portion 42 formed in the case member 40, which will be described below, constitute a portion of the liquid flow channel. The first common liquid chamber 17, the second common liquid chamber 18, and the liquid chamber portion 42 form a common liquid chamber portion that reserves liquid supplied to the nozzle 21. The nozzle communicating port 19 is a through hole extending through the communicating substrate 15 in the Z-axis direction and couples the dedicated flow channel U1 formed in the pressure chamber substrate 10 to the nozzle 21. The nozzle communicating port 19 is a flow channel through which liquid is discharged from the dedicated flow channel U1. The number of the nozzle communicating ports 19 formed in the communicating substrate 15 corresponds to the number of the number of nozzles 21.

As illustrated in FIG. 2, the nozzle substrate 20 is fixed to the lower surface of the communicating substrate 15 by using an adhesive. The nozzle substrate 20 is formed of, for example, a silicon single-crystal substrate. A plurality of nozzles 21 are formed in the nozzle substrate 20.

As illustrated in FIG. 3, the protective substrate 30 is fixed to the upper surface of the diaphragm 180 by using an adhesive. The material forming the protective substrate 30 is the same as that of the pressure chamber substrate 10. The protective substrate 30 is provided to protect the actuator 150 and to reinforce the strength of the pressure chamber substrate 10 and the diaphragm 180.

A recess portion 33 and a through hole 39 are formed in the protective substrate 30. The recess portion 33 is a recess portion that is open on the −Z side. Therefore, the protective substrate 30 is not stacked on part of a portion of the diaphragm 180 that opposes the pressure chamber 12. Since the recess portion 33 is not coupled to a liquid flow channel, no liquid flows through the recess portion 33. The through hole 39 is a through hole extending through the protective substrate 30 in the Z-axis direction for the wiring substrate 200 to be inserted.

As illustrated in FIG. 2, the case member 40 is disposed on the communicating substrate 15. The case member 40 is formed, of, for example, a resin material. As illustrated in FIG. 3, the case member 40 includes the liquid chamber portion 42, a coupling port 43, and two liquid flowing ports 44. The liquid chamber portion 42, together with the first common liquid chamber 17 and the second common liquid chamber 18 formed in the communicating substrate 15, constitutes a portion of the liquid flow channel. The coupling port 43 is a through hole extending through the case member 40 in the Z-axis direction. The wiring substrate 200 is inserted into the coupling port 43. The liquid flowing port 44 is a through hole extending through the case member 40 in the Z-axis direction. Liquid flows into the liquid ejecting head 100 from the liquid flowing port 44.

Figure 5:
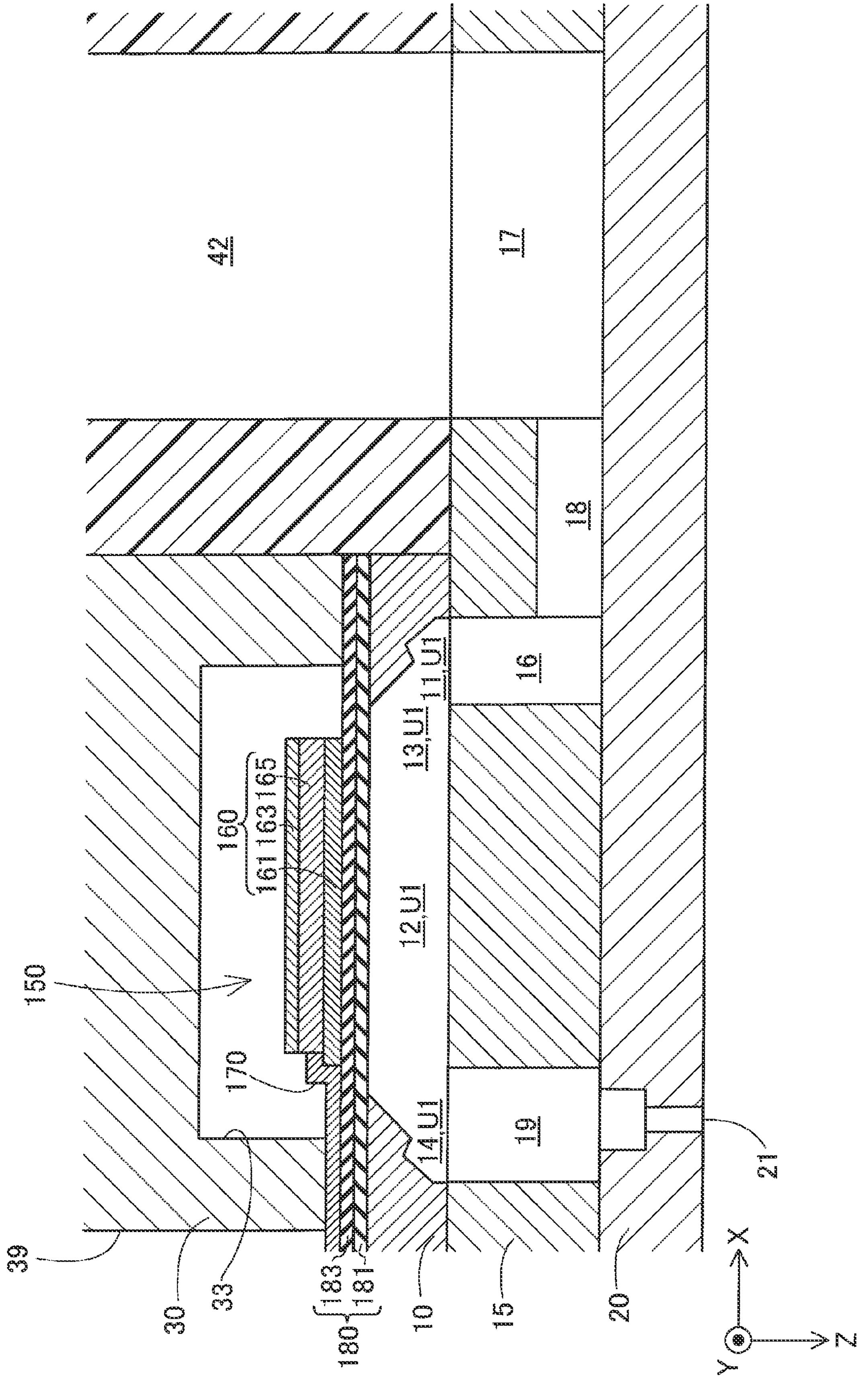
FIG. 5 is an enlarged view of a head body and a case member.

FIG. 5 is an enlarged view of a configuration of the head body and the case member 40 in the liquid ejecting head 100 in FIG. 3. The head body includes the pressure chamber substrate 10, the communicating substrate 15, the nozzle substrate 20, and the diaphragm 180. As illustrated in FIG. 5, the actuator 150 is disposed on the diaphragm 180 inside the recess portion 33 formed on the protective substrate 30. The actuator 150 vibrates the diaphragm 180 to apply pressure to liquid in the pressure chamber 12. When pressure is applied to the liquid in the pressure chamber 12, the liquid is ejected from the nozzle 21 through the nozzle communicating port 19. The actuator 150 includes a piezoelectric element 160 and wiring 170.

The piezoelectric element 160 includes a plurality of first electrodes 161, a second electrode 163, and a piezoelectric body 165. The first electrode 161, the piezoelectric body 165, and the second electrode 163 are stacked in this order along the stacking direction. The first electrode 161 is disposed at a position overlapping the corresponding pressure chamber 12 on the upper side of the diaphragm 180 when viewed in the stacking direction. The second electrode 163 is an electrode common to the plurality of first electrodes 161, and thus is disposed over a range overlapping all first electrodes 161. The first and second electrodes 161 and 163 are formed of various metals such as platinum (Pt), iridium (Ir), titanium (Ti), tungsten (W), tantalum (Ta), and conductive metal oxides such as lanthanum nickelate ($LaNiO_3$), etc. The piezoelectric body 165 is formed of, for example, lead zirconate titanate (PZT). The first electrode 161 is electrically coupled to a driving circuit 201 that will be described below via the wiring 170. The second electrode 163 is electrically coupled to the driving circuit 201 via not-illustrated wiring.

The diaphragm 180 is stacked on the pressure chamber substrate 10 at a position overlapping the pressure chambers 12 when viewed in the stacking direction. The diaphragm 180 includes a flexible layer 181 and a protective layer 183. The flexible layer 181 is deposited on the pressure chamber substrate 10. The flexible layer 181 is formed of, for example, silicon dioxide ($SiO_2$). The protective layer 183 is deposited on the flexible layer 181. The protective layer 183 is an insulating film formed of, for example, zirconium oxide ($ZrO_2$). At least a portion of the diaphragm 180 may be constituted of a substrate common to the pressure chamber substrate 10. For example, silicon dioxide, which constitutes the flexible layer 181, can be deposited by thermally oxidizing a surface of the silicon single-crystal substrate constituting the pressure chamber substrate 10. In such a case, the pressure chamber 12 is still described as being open in the pressure chamber substrate 10 for the sake of convenience.

As illustrated in FIG. 3, the driving circuit 201 is provided on the wiring substrate 200. The driving circuit 201 generates driving signals to drive the actuator 150 based on control signals supplied from the controller 500.

Details of the internal shape of the dedicated flow channel U1 in this embodiment will now be described. The dedicated flow channel U1 is also referred to as a pressure chamber space.

Figure 6:
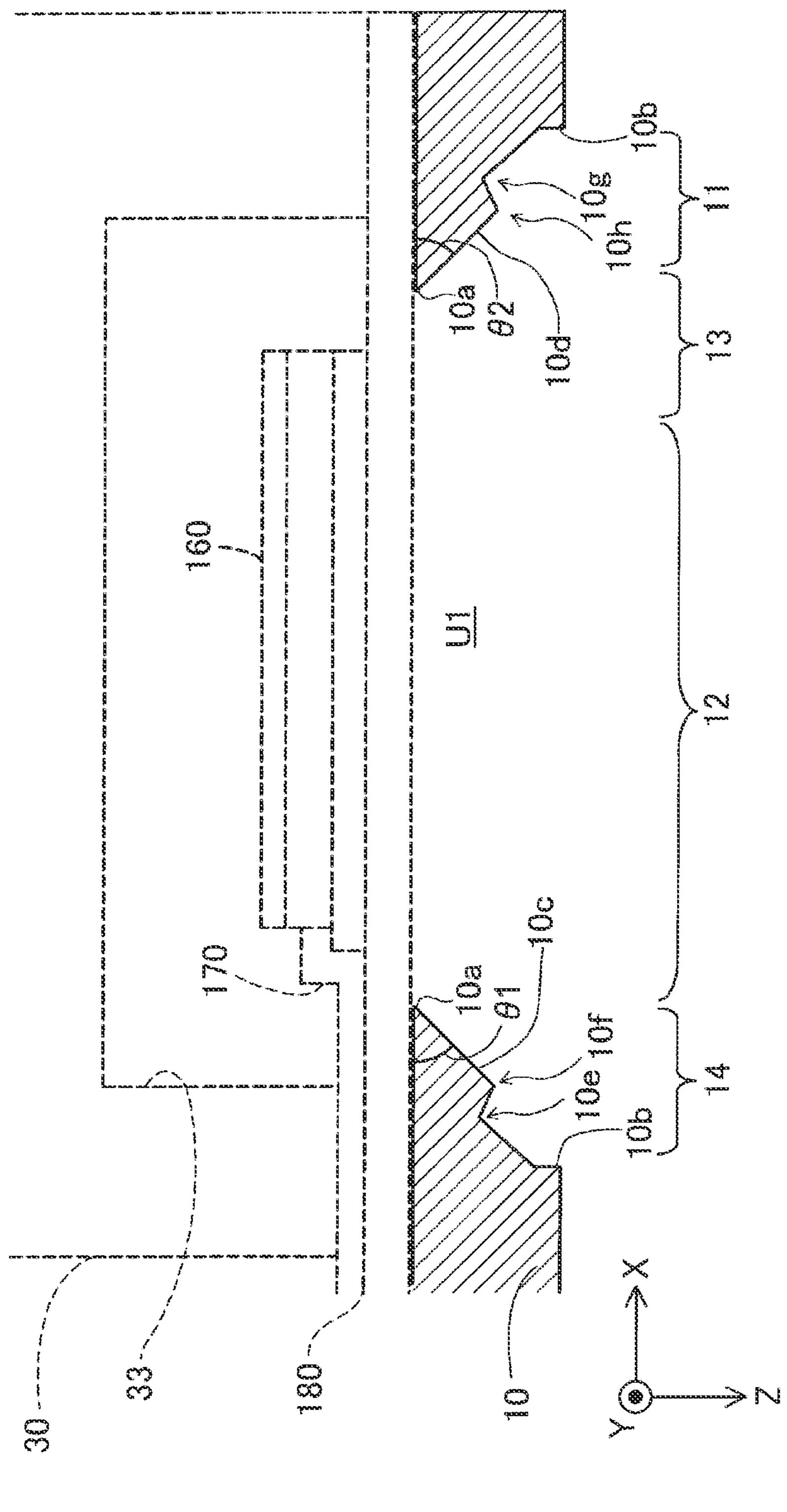
FIG. 6 illustrates a shape of a dedicated flow channel in a pressure chamber substrate.

FIG. 6 illustrates the shape of the dedicated flow channel U1 formed in the pressure chamber substrate 10. In FIG. 6, the communicating substrate 15 is not illustrated. The protective substrate 30, the piezoelectric element 160, wiring 170, and the diaphragm 180 are represented by dashed lines. In the dedicated flow channel U1, the through hole formed in the pressure chamber substrate 10 includes a first opening 10*a*, a second opening 10*b*, an inclined surface 10*c*, an inclined surface 10*d*, a recess portion 10*e*, a protruding portion 10*f*, a recess portion 10*g* and a protruding portion 10*h*. The inclined surface 10*c* is also referred to as a first inclined surface. The inclined surface 10*d* is also referred to as a second inclined surface. The recess portion 10*e* is also referred to as a first recess portion. The recess portion 10*g* is also referred to as a second recess portion. The protruding portion 10*f* is also referred to as a first protruding portion. The protruding portion 10*h* is also referred to as a second protruding portion.

The first opening 10*a* is an opening formed on the upper side of the pressure chamber substrate 10. The first opening 10*a* is an opening that exposes at least a portion of the diaphragm 180 stacked on the pressure chamber substrate 10 to the dedicated flow channel U1. The first opening 10*a* overlaps an area occupied by the pressure chamber 12 and the introduction channel 13 when viewed in the stacking direction.

The second opening 10*b* is an opening formed on the lower side of the pressure chamber substrate 10. As illustrated in FIG. 5, the second opening 10*b* is an opening that couples the dedicated flow channel U1 to a flow channel formed in the communicating substrate 15 with the pressure chamber substrate 10 and the communicating substrate 15 stacked. As illustrated in FIG. 6, an opening area of the second opening 10*b* is larger than an opening area of the first opening 10*a*. When viewed in the stacking direction, the second opening 10*b* includes the first opening 10*a*. Therefore, a wall portion coupling the first opening 10*a* to the second opening 10*b* is an inclined surface.

The inclined surface 10*c* is a wall portion coupling the first opening 10*a* to the second opening 10*b* at one of two ends of the dedicated flow channel U1 in the X-axis direction. The inclined surface 10*c* is also referred to as a wall portion. The inclined surface 10*c* constitutes a portion of an inner wall portion that partitions the dedicated flow channel U1. The inclined surface 10*d* is a wall portion coupling the first opening 10*a* to the second opening 10*b* at the other of the two ends of the dedicated flow channel U1 in the X-axis direction. The inclined surface 10*d* is also referred to as a wall portion. The inclined surface 10*d* constitutes a portion of an inner wall portion that partitions the dedicated flow channel U1.

Both an inclination θ1 of the inclined surface 10*c* with respect to the diaphragm 180 and an inclination θ2 of the inclined surface 10*d* with respect to the diaphragm 180 are set to be less than 90 degrees. In the embodiment, the inclination θ1 and the inclination θ2 are 45 degrees.

The protruding portion 10*f* and the recess portion 10*e* are formed on the inclined surface 10*c*. The protruding portion 10*f* protrudes in the direction from the diaphragm 180 to the communicating substrate 15, that is, in the +Z direction. The recess portion 10*e* is recessed in the direction from the communicating substrate 15 to the diaphragm 180, that is, in the −Z direction. The direction from the communicating substrate 15 to the diaphragm 180 is also referred to as a first direction. The protruding portion 10*h* and the recess portion 10*g* are formed on the inclined surface 10*d*. The protruding portion 10*h* protrudes in the direction from the diaphragm 180 to the communicating substrate 15, that is, in the +Z direction. The recess portion 10*g* is recessed in the direction from the communicating substrate 15 to the diaphragm 180, that is, in the −Z direction.

The protruding portion 10*f* is on the side of the first opening 10*a* with respect to the recess portion 10*e* in the stacking direction. In other words, the protruding portion 10*f* is closer than the recess portion 10*e* to the first opening 10*a* when the dedicated flow channel U1 is viewed in a section cut in the XZ plane parallel to both the longitudinal direction (X-axis direction) in which the dedicated flow channel U1 extends and the stacking direction (Z-axis direction). The protruding portion 10*h* is on the side of the first opening 10*a* with respect to the recess portion 10*g* in the stacking direction. In other words, the protruding portion 10*h* is located closer than the recess portion 10g to the first opening 10*a* when the dedicated flow channel U1 is viewed in a section cut in the XZ plane.

The following describes a method for manufacturing a piezoelectric device, which includes a step of stacking the diaphragm 180, the pressure chamber substrate 10, and the communicating substrate 15. The piezoelectric device is a component of the liquid ejecting head 100 and vibrates the diaphragm 180 to apply pressure to liquid reserved in the pressure chamber space, when the piezoelectric element 160 is driven.

The pressure chamber substrate 10 is also referred to as a second substrate. The communicating substrate 15 is also referred to as a first substrate. First, a flexible layer 181 that constitutes a portion of the diaphragm 180 is deposited on one side of the pressure chamber substrate 10. Next, a protective layer 183 is deposited on the flexible layer 181. The piezoelectric element 160 is subsequently formed on the protective layer 183. A mask is then formed on the other side of the pressure chamber substrate 10 to form a space constituting the dedicated flow channel U1. Through the mask, the pressure chamber substrate 10 is etched to form the space that constitutes the dedicated flow channel U1. Here, the etching includes isotropic etching and anisotropic etching. As a result, a first opening 10*a* is formed on one side of the pressure chamber substrate 10, the side on which the diaphragm 180 is provided. A second opening 10*b* is formed on the other side of the pressure chamber substrate 10.

Thereafter, the communicating substrate 15 is bonded to the pressure chamber substrate 10. When bonding the communicating substrate 15 to the pressure chamber substrate 10, the pressure chamber substrate 10 is first disposed with the second opening 10*b* side up. An adhesive is applied to the surface of the pressure chamber substrate 10 on the second opening 10*b* side. The communicating substrate 15 is disposed on the pressure chamber substrate 10. Thus, the pressure chamber substrate 10 and the communicating substrate 15 are bonded by using an adhesive. The nozzle substrate 20 is then stacked on the communicating substrate 15. In this way, the piezoelectric device is manufactured.

When bonding the communicating substrate 15 to the pressure chamber substrate 10, a portion of the adhesive may protrude from the surface where the pressure chamber substrate 10 and the communicating substrate 15 are in contact. Since the pressure chamber substrate 10 is disposed under the communicating substrate 15 with the second opening 10*b* side up, adhesive that protrudes may run along an inner wall that partitions the dedicated flow channel U1 and reach the diaphragm 180. When adhesive adhering to the diaphragm 180 hardens, the flexible region of the diaphragm 180 cannot flex sufficiently during liquid ejecting. Variation in the amount of adhesive adhering to the flexible region of the diaphragm 180 causes variation in the liquid ejecting characteristics of each pressure chamber. This results in variation in the image quality of each liquid ejecting apparatus 300.

Figure 7:
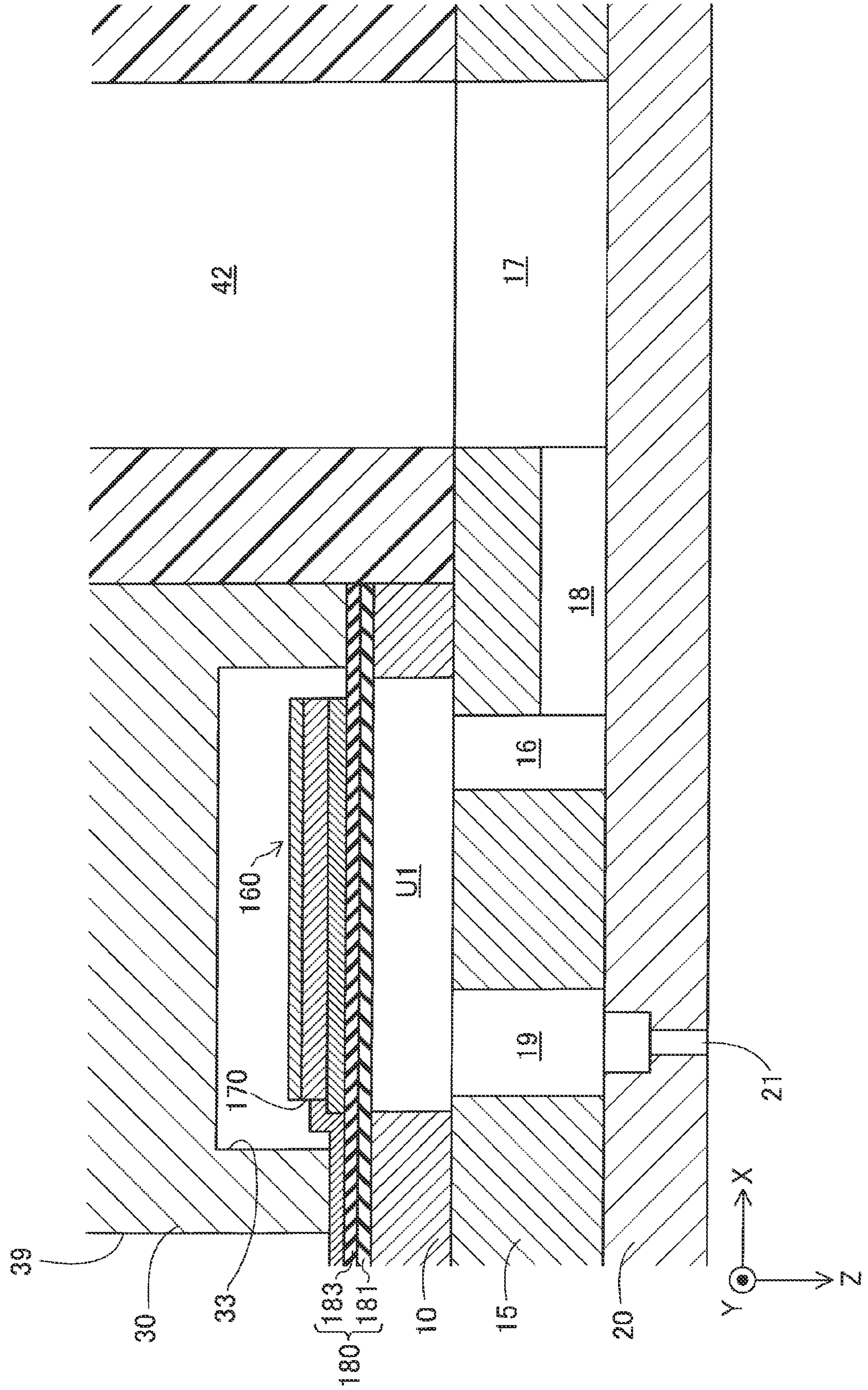
FIG. 7 is a diagram for explaining the advantage of having the dedicated flow channel with the shape in the embodiment.

FIG. 7 is a diagram for explaining the advantage of the liquid ejecting head 100 in this embodiment having the dedicated flow channels U1 with the shape described above. In an example shown in FIG. 7, a portion of the inner wall portion partitioning the dedicated flow channel U1 is not formed as an inclined surface. On the other hand, in this embodiment, the inner wall coupling the second opening 10*b* formed on the side overlapping the communicating substrate 15 to the first opening 10*a* formed on the side overlapping the diaphragm 180 is formed as inclined surfaces 10*c* and 10*d* inclined with respect to the diaphragm 180. Compared to an aspect illustrated in FIG. 7, an aspect according to this embodiment illustrated in FIG. 6 can increase the distance along the inner wall that partitions the dedicated flow channel U1 along which the adhesive bonding the communicating substrate 15 and the pressure chamber substrate 10 is to travel before reaching the diaphragm 180. Therefore, adhesive can be prevented from reaching the diaphragm 180, or the possibility of adhesive reaching the diaphragm 180 can be reduced.

Furthermore, the recess portion 10*e* and the protruding portion 10*f* are provided on the inclined surface 10*c*, and the recess portion 10*g* and the protruding portion 10*h* are provided on the inclined surface 10*d*. Therefore, when a portion of adhesive bonding the communicating substrate 15 and the pressure chamber substrate 10 flows into the pressure chamber space, the adhesive is retained in the recess portions 10*e* and 10*g*. Therefore, adhesive can be prevented from reaching the diaphragm 180, or the possibility of adhesive reaching the diaphragm 180 can be reduced.

Therefore, the possibility of adhesive adhering to the flexible region of the diaphragm 180 and hardening can be reduced, and occurrence of variation in the image quality of each liquid ejecting apparatus 300 can be suppressed. Even though some of the adhesive reaches the diaphragm 180, the amount of adhesive adhering to the diaphragm 180 can be reduced in an aspect according to this embodiment compared to the aspect illustrated in FIG. 7. Therefore, in the flexible region of the diaphragm 180, the extent to which adhesive adheres can be smaller than that in aspects in the related art.

As illustrated in FIG. 6, when the dedicated flow channel U1 is viewed in a section cut in the XZ plane parallel to both the longitudinal direction (X-axis direction) in which the dedicated flow channel U1 extends and the stacking direction (Z-axis direction), the protective substrate 30 is stacked on a surface of the diaphragm 180 on a side opposite to a side opposing the pressure chamber substrate 10, that is, the upper surface, on a region overlapping the recess portion 10*e*. The protective substrate 30 is also stacked on the upper side of the diaphragm 180 in an area overlapping the recess portion 10*g*. The areas in which the recess portions 10*e* and 10*g* are formed on the pressure chamber substrate 10 are locally thinner. Further, the pressure chamber substrate 10 is formed of a silicon single-crystal substrate. Therefore, it is assumed that the strength of the pressure chamber substrate 10 in a region where the recess portions 10*e* and 10*g* are formed is lower than in other regions due to stress concentration. The strength of the region can be reinforced by overlapping the protective substrate 30 within the range overlapping the region.

As illustrated in FIG. 6, the introduction channel 13 is located on the side of the first opening 10*a* with respect to both the recess portion 10*g* and protruding portion 10*h* in the stacking direction. In other words, the introduction channel 13 is located closer than both the recess portion 10*g* and protruding portion 10*h* to the first opening 10*a*, that is, farther than both the recess portion 10*g* and protruding portion 10*h* from the second opening 10*b*, when the dedicated flow channel U1 is viewed in a section cut in the XZ plane parallel to both the longitudinal direction (X-axis direction) in which the dedicated flow channel U1 extends and the stacking direction (Z-axis direction). The width of the introduction channel 13 is narrower than the width of the pressure chamber 12. Therefore, when a portion of adhesive interferes with the introduction channel 13, liquid cannot flow smoothly. The configuration described above can prevent a portion of adhesive bonding the communicating substrate 15 and the pressure chamber substrate 10 from interfering with the introduction channel 13.

B. Alternative Embodiments

B1. Alternative Embodiment 1

Figure 8:
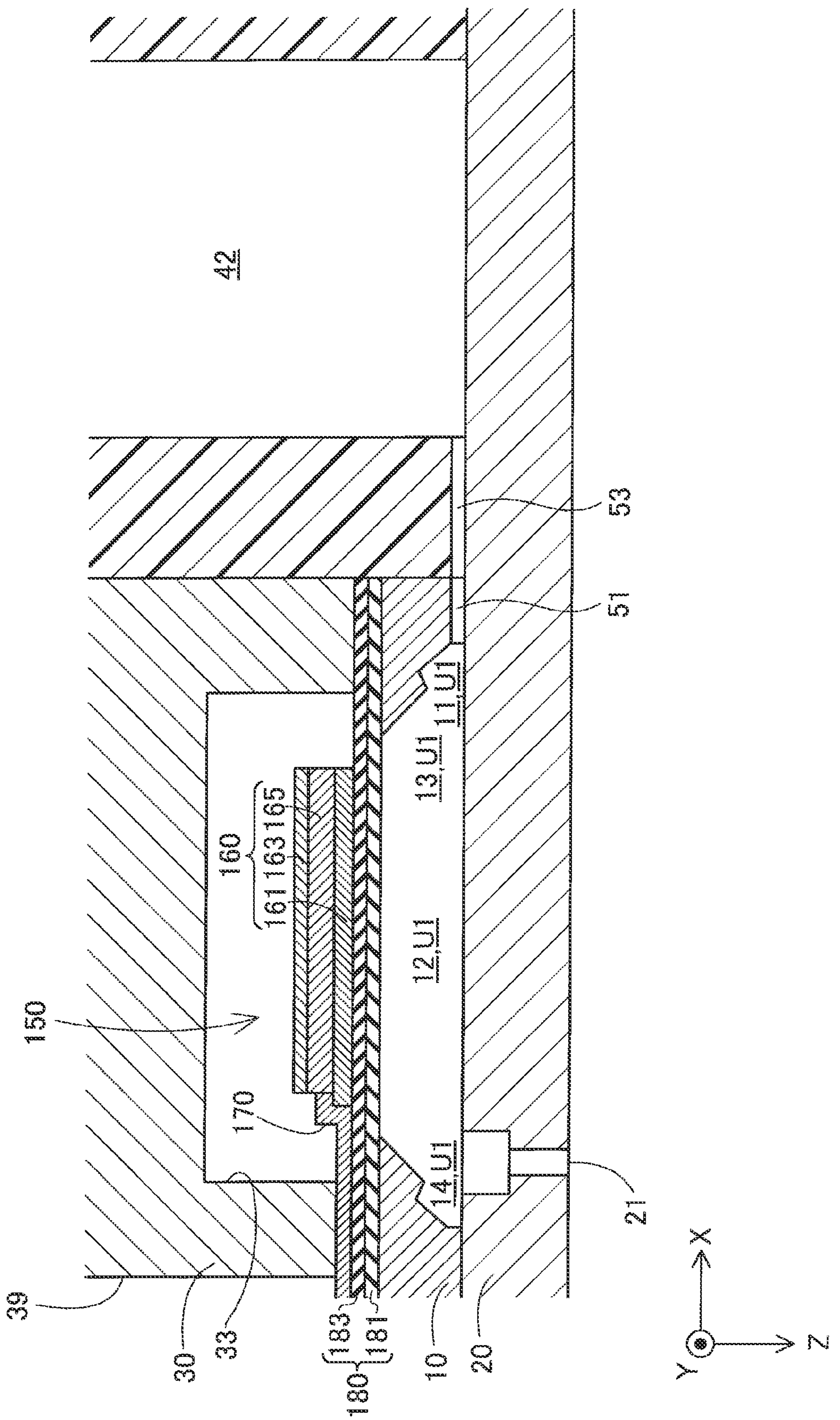
FIG. 8 is an enlarged view of a configuration of a head body and a case member in a liquid ejecting head without a communicating substrate.

FIG. 8 is an enlarged view of a configuration of the head body and the case member 40 in the liquid ejecting head 100 without the communicating substrate 15. In the embodiment described above, an example in which a communicating substrate 15 is provided between the nozzle substrate 20 and the pressure chamber substrate 10 has been described (see FIG. 5). However, the liquid ejecting head 100 may not have a communicating substrate 15. As illustrated in FIG. 8, the pressure chamber substrate 10 is stacked on the upper side of the nozzle substrate 20. In addition to the dedicated flow channel U1, a flow channel 51 along the X-axis direction is formed in the pressure chamber substrate 10 to couple the dedicated flow channel U1 to the liquid chamber portion 42 of the case member 40. In the case member 40, a flow channel 53 coupled to the flow channel 51 is formed to couple the dedicated flow channel U1 to the liquid chamber portion 42.

B2. Alternative Embodiment 2

In the embodiment described above, an example in which a recess portion and a protruding portion are formed on the inclined surfaces 10*c* and 10*d*, respectively, has been described. However, recess and protruding portions may be formed on only either the inclined surfaces 10*c* or 10*d*. In this case, adhesive can be also prevented from reaching the diaphragm 180, and the possibility of adhesive reaching the diaphragm 180 can be reduced.

Alternatively, recess portions may be respectively formed on the inclined surface 10*c* and the inclined surface 10*d* without protruding portions. Alternatively, protruding portions may be formed on the respective inclined surfaces 10*c* and 10*d* without recess portions. In this case, adhesive can be also prevented from reaching the diaphragm 180, and the possibility of adhesive reaching the diaphragm 180 can be reduced.

B3. Alternative Embodiment 3

Figure 9:
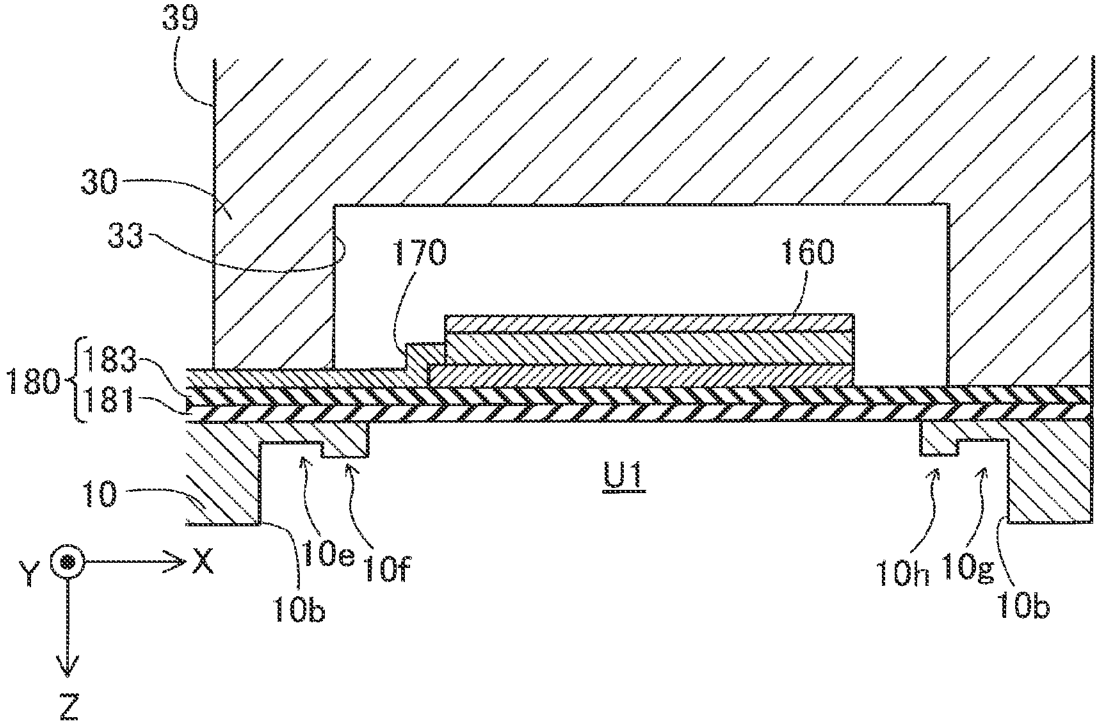
FIG. 9 illustrates a shape of a dedicated flow channel formed in a pressure chamber substrate according to another embodiment 3.

FIG. 9 illustrates a shape of the dedicated flow channel U1 formed in the pressure chamber substrate 10 according to another embodiment 3. In FIG. 9, the communicating substrate 15 is not illustrated. In the embodiment described above, an example wherein the wall portion coupling the first opening 10*a* to the second opening 10*b* is formed as an inclined surface 10$c$ at one of the two ends of the dedicated flow channel U1 in the X-axis direction has been described. However, as illustrated in FIG. 9, at one of two ends of the dedicated flow channel U1 in the X-axis direction, the wall portion coupling the first opening 10$a$ to the second opening 10$b$ may not be formed as an inclined surface. Similarly, at the other of the two ends of the dedicated flow channel U1 in the X-axis direction, the wall portion coupling the first opening 10$a$ to the second opening 10$b$ may not be formed as an inclined surface. Similarly in the other Embodiment 3, when a portion of adhesive bonding the communicating substrate 15 and the pressure chamber substrate 10 flows into the pressure chamber space, the adhesive is retained in the recess portions 10$e$ and 10$g$. Therefore, adhesive can be prevented from reaching the diaphragm 180, and the possibility of adhesive reaching the diaphragm 180 can be reduced.

Alternatively, at one of the two ends of the dedicated flow channel U1 in the X-axis direction, the wall portion coupling the first opening 10$a$ to the second opening 10$b$ may be formed as an inclined surface, and at the other end, the wall portion coupling the first opening 10$a$ to the second opening 10$b$ may not be formed as an inclined surface.

B4. Alternative Embodiment 4

In the embodiments described above, an example wherein the through hole formed in the pressure chamber substrate 10 includes two inclined surfaces 10$c$ and 10$d$ has been described. However, the through hole formed in the pressure chamber substrate 10 may include only either the inclined surfaces 10$c$ or 10$d$. In this case, recess and protruding portions are formed on one of the inclined surfaces.

B5. Alternative Embodiment 5

In the embodiment, as illustrated in FIG. 6, an example is described in which an inclination angle θ1 of the inclined surface 10$c$ to the diaphragm 180 and an inclination angle θ2 of the inclined surface 10$d$ to the diaphragm 180 are both 45 degrees. However, the embodiment is not limited to the above example. The inclination angle θ1 may be different from the inclination angle θ2. Preferably, the inclination angle θ1 and θ2 are set in the range of 10 to 60 degrees, respectively. More preferably, the inclination angle θ1 and θ2 are set in the range of 45 to 50 degrees, respectively.

B6. Alternative Embodiment 6

In the embodiment, as illustrated in FIG. 6, an example wherein the first opening 10$a$ overlaps an area occupied by the pressure chamber 12 and the introduction channel 13 when viewed in the stacking direction, has been described. However, the first opening 10$a$ should overlap at least the area occupied by the pressure chamber 12 when viewed in the stacking direction. This is because pressure is sufficiently applied to liquid in the pressure chamber 12 by driving the piezoelectric element 160.

B7. Alternative Embodiment 7

In the embodiment, an example is described wherein the recess portion 10$e$ and the protruding portion 10$f$ are provided at the inclined surface 10$c$ provided at one end of both ends in the longitudinal direction (X-axis direction) in which the dedicated flow channel U1 extends, and the recess portion 10$g$ and the protruding portion 10$h$ are provided at an inclined surface 10$d$ provided at the other end of both ends in the longitudinal direction. The recess and protruding portions are not provided at one end and the other end of the dedicated flow channel U1 in the lateral direction. Most of adhesive tends to flow into the pressure chamber space from both the sharp corner portion P1 at one end in the longitudinal direction (X-axis direction) and the sharp corner portion P2 at the other end in the longitudinal direction, as illustrated in FIG. 4. Therefore, in the embodiment, the recess and protruding portions are not provided at one end and the other end of the dedicated flow channel U1 in the lateral direction. This can reduce efforts required to form the recess and protruding portions.

B8. Alternative Embodiment 8

In the embodiment, an example wherein ink supply channels 16 for introducing liquid into the dedicated flow channel U1 and a nozzle communicating port 19 for discharging liquid from the dedicated flow channel U1 are provided in the communicating substrate 15 has been described. However, only either the ink supply channels 16 or the nozzle communicating port 19 may be formed in the communicating substrate 15.

The present disclosure is not limited to the embodiments described above, but can be realized in various configurations within the scope that does not deviate from the purpose. For example, technical features in the embodiments corresponding to technical features in each aspects described in the summary section can be replaced or combined as appropriate to resolve some or all of the above issues or to achieve some or all of the above effects. Also, when the technical features are not described as essential in the specification, they can be deleted as appropriate.

C. Alternative Embodiment (1) According to a first aspect of the present disclosure, a liquid ejecting head is provided. This liquid ejecting head includes a flow channel substrate having at least one space forming a flow channel guiding liquid to a nozzle, a pressure chamber substrate having at least one pressure chamber space coupled to the space of the flow channel substrate, a diaphragm disposed at a position overlapping the pressure chamber space, and a piezoelectric element that vibrates the diaphragm to apply pressure to the liquid inside the pressure chamber space. The flow channel substrate, the pressure chamber substrate, the diaphragm, and the piezoelectric element are stacked in this order. The flow channel substrate and the pressure chamber substrate are bonded by using an adhesive. The pressure chamber substrate includes a first opening formed in a surface on a diaphragm side and exposing at least a portion of the diaphragm to the pressure chamber space, a second opening being different from the first opening, formed in a surface on a flow channel substrate side, and coupling the pressure chamber space to the flow channel formed in the flow channel substrate, at least one wall portion being an inner wall portion partitioning the pressure chamber space and coupling the first opening to the second opening, at least one recess portion formed on the at least one wall portion and recessed in a first direction from the flow channel substrate to the diaphragm, and at least one protruding portion formed on the at least one wall portion and protruding in a direction opposite to the first direction, the protruding portion being disposed between the at least one recess portion and the first opening in a longitudinal direction of the pressure chamber space when the pressure chamber space is viewed in a section cut in a plane parallel to the longitudinal direction and a stacking direction. According to the above aspect, the liquid ejecting head includes a recess portion and a protruding portion disposed between the recess portion and the first opening in the longitudinal direction in the wall portion coupling the second opening to the first opening. As a result, when a portion of adhesive bonding the flow channel substrate and the pressure chamber substrate flows into the pressure chamber space, the adhesive is retained in the recess portion. Therefore, the adhesive can be prevented from reaching the diaphragm. Therefore, the possibility of adhesive adhering to the flexible region of the diaphragm and hardening can be reduced, and occurrence of variation in the image quality of each liquid ejecting apparatus can be suppressed.

(2) In the above aspect, at least one of a flow channel for introducing the liquid into the pressure chamber space and a flow channel for discharging the liquid from the pressure chamber space may be formed in the flow channel substrate, and the at least one of the flow channels may be coupled to the second opening.

(3) In the above aspect, the nozzle may be formed in the flow channel substrate, and the nozzle may be coupled to the first opening.

(4) In the above aspect, the at least one wall portion may include a first inclined surface and a second inclined surface. The at least one recess portion may have a first recess portion and a second recess portion. The at least one protruding portion may have a first protruding portion and a second protruding portion. When the pressure chamber space is viewed in the section cut in the parallel plane, the first inclined surface may be an inclined surface coupling the first opening to the second opening at one of two ends in the longitudinal direction of the pressure chamber space, the first recess portion and the first protruding portion may be disposed on the first inclined surface, the second inclined surface may be an inclined surface coupling the first opening to the second opening at the other of the two ends in the longitudinal direction of the pressure chamber space, and the second recess portion and the second protruding portion may be disposed on the second inclined surface.

(5) In the above aspect, the pressure chamber substrate may further include an introduction channel that is coupled to the pressure chamber space and introduces the liquid into the pressure chamber space, and a length of the introduction channel in a lateral direction intersecting the longitudinal direction may be less than a length of the pressure chamber space in the lateral direction when viewed in the stacking direction. The introduction channel may be located closer than the first recess portion and the second recess portion to the first opening in the longitudinal direction when the pressure chamber space is viewed in the section cut in the parallel plane. According to the above aspect, since the introduction channel is located closer than the first and second recess portions to the first opening, a portion of an adhesive from the second opening formed in the surface to which the flow channel substrate is bonded can be prevented from interfering with the introduction channel.

(6) In the above aspect, a protective substrate may be stacked on a surface of the diaphragm on a side opposite to a side opposing the pressure chamber substrate and in an area overlapping the first recess portion and the second recess portion. The protective substrate may not be stacked on part of a portion of the diaphragm opposing the pressure chamber space. According to the above aspect, the protective substrate is overlapped at the position where the recess portion is formed on the pressure chamber substrate, thereby reinforcing the strength of the portion where the recess portion is formed on the pressure chamber substrate.

(7) In the above aspect, the pressure chamber substrate may be formed of a silicon single-crystal substrate.

(8) According to a second aspect of the present disclosure, a method for manufacturing a piezoelectric device is provided. A first substrate, a second substrate, a diaphragm, and a piezoelectric element are stacked in this order in the piezoelectric device. The manufacturing method includes a step of depositing a flexible film as the diaphragm on one side of the second substrate, a step of forming the piezoelectric element on the flexible film, a step of forming a space in the second substrate, the step including forming a first opening located on the one side of the second substrate, a second opening located on the other side of the second substrate, and a wall portion coupling the first opening to the second opening, the wall portion including at least one recess portion and at least one protruding portion located farther than the at least one recess portion from the second opening, and a step of bonding, by using an adhesive, the first substrate at the other side of the second substrate disposed with the second opening up. According to the above aspect, the inner wall portion coupling the second opening on the side overlapping the first substrate to the first opening on the side overlapping the diaphragm is formed as an inclined surface inclined with respect to the diaphragm. As a result, when bonding the first substrate to the second substrate, the distance for an adhesive bonding the first substrate to the second substrate to reach the diaphragm through the inner wall portion that partitions a space can be longer than in an aspect where the inner wall portion coupling the second opening to the first opening is not formed as an inclined surface. Therefore, the adhesive can be prevented from reaching the diaphragm. Furthermore, in the first substrate, a recess portion, near the second opening, formed on a surface on the first substrate side and a protruding portion farther than the recess portion from the second opening are formed on the inclined surface coupling the second opening to the first opening. As a result, when a portion of an adhesive bonding the first substrate and the second substrate flows into the pressure chamber space, the adhesive is retained in the recess portion. Therefore, the adhesive can be prevented from reaching the diaphragm. Therefore, the possibility of an adhesive adhering to the flexible region of the diaphragm and hardening can be reduced. The occurrence of variation in the movement of each piezoelectric device can be suppressed.

The present disclosure is not limited to aspects as a liquid ejecting apparatus described above, but can be realized in various aspects, such as a liquid ejecting system, a multi-functional machine equipped with a liquid ejecting apparatus, and the like.

What is claimed is:

1. A liquid ejecting head comprising:

a flow channel substrate having at least one space forming a flow channel guiding liquid to a nozzle;

a pressure chamber substrate having a pressure chamber space coupled to the space of the flow channel substrate;

a diaphragm disposed at a position overlapping the pressure chamber space; and a piezoelectric element that vibrates the diaphragm to apply pressure to the liquid inside the pressure chamber space, wherein the flow channel substrate, the pressure chamber substrate, the diaphragm, and the piezoelectric element are stacked in this order in a first direction, the flow channel substrate and the pressure chamber substrate are bonded by an adhesive, and the pressure chamber substrate includes a first opening formed in a surface on a diaphragm side and exposing at least a portion of the diaphragm to the pressure chamber space, a second opening formed in a surface on a flow channel substrate side, and coupling the pressure chamber space to the flow channel formed in the flow channel substrate, at least one wall portion being an inner wall portion partitioning the pressure chamber space and coupling the first opening to the second opening, at least one recess portion formed on the at least one wall portion and recessed in the first direction, and at least one protruding portion formed on the at least one wall portion and protruding in a direction opposite to the first direction, the protruding portion being disposed between the at least one recess portion and the first opening in a longitudinal direction of the pressure chamber space when the pressure chamber space is viewed in a section cut in a plane parallel to the longitudinal direction and the first direction, the at least one protruding portion being closer to the second opening than a bottom of the at least one recess portion.

2. The liquid ejecting head according to claim 1, wherein at least one of a flow channel for introducing the liquid into the pressure chamber space and a flow channel for discharging the liquid from the pressure chamber space is formed in the flow channel substrate, and the at least one of the flow channels is coupled to the second opening.

3. The liquid ejecting head according to claim 1, wherein the nozzle is formed in the flow channel substrate, and the nozzle is coupled to the second opening.

4. The liquid ejecting head according to claim 2, wherein the at least one wall portion includes a first inclined surface and a second inclined surface, the at least one recess portion has a first recess portion and a second recess portion, the at least one protruding portion has a first protruding portion and a second protruding portion, and when the pressure chamber space is viewed in the section cut in the plane that is parallel, the first inclined surface is an inclined surface coupling the first opening to the second opening at one of two ends in the longitudinal direction of the pressure chamber space, the first recess portion and the first protruding portion are disposed on the first inclined surface, the second inclined surface is an inclined surface coupling the first opening to the second opening at the other of the two ends in the longitudinal direction of the pressure chamber space, and the second recess portion and the second protruding portion are disposed on the second inclined surface.

5. The liquid ejecting head according to claim 4, wherein the pressure chamber substrate further includes an introduction channel that is coupled to the pressure chamber space and introduces the liquid into the pressure chamber space, and a length of the introduction channel in a lateral direction intersecting the longitudinal direction is less than a length of the pressure chamber space in the lateral direction when viewed in the first direction, and the introduction channel is located closer than the first recess portion and the second recess portion to the first opening in the longitudinal direction when the pressure chamber space is viewed in the section cut in the plane that is parallel.

6. The liquid ejecting head according to claim 5, wherein a protective substrate is stacked on a surface of the diaphragm on a side opposite to a side opposing the pressure chamber substrate and in an area overlapping the first recess portion and the second recess portion, and the protective substrate is not stacked on part of a portion of the diaphragm opposing the pressure chamber space.

7. The liquid ejecting head according to claim 6, wherein the pressure chamber substrate is formed of a silicon single-crystal substrate.

8. A method for manufacturing a piezoelectric device in which a first substrate, a second substrate, a diaphragm, and a piezoelectric element are stacked in this order, the method comprising:

a step of depositing a flexible film as the diaphragm on one side of the second substrate;

a step of forming the piezoelectric element on the flexible film;

a step of forming a space in the second substrate, the step including forming a first opening located on the one side of the second substrate, a second opening located on the other side of the second substrate, and a wall portion coupling the first opening to the second opening, the wall portion including at least one recess portion and at least one protruding portion located farther than the at least one recess portion from the second opening and the at least one protruding portion being closer to the second opening than a bottom of the at least one recess portion; and a step of bonding, by using an adhesive, the first substrate at the other side of the second substrate disposed with the second opening up.

9. A liquid ejecting head comprising:

a flow channel substrate having a space forming a flow channel guiding liquid to a nozzle;

a pressure chamber substrate having a pressure chamber space coupled to the space of the flow channel substrate;

a diaphragm disposed at a position overlapping the pressure chamber space; and an actuator that vibrates the diaphragm to apply pressure to the liquid inside the pressure chamber space, wherein the flow channel substrate, the pressure chamber substrate, the diaphragm, and the actuator are stacked in this order in a first direction, the flow channel substrate and the pressure chamber substrate are bonded by an adhesive, and the pressure chamber substrate includes a first opening formed in a surface on a diaphragm side and exposing a portion of the diaphragm to the pressure chamber space, a second opening formed in a surface on a flow channel substrate side, and coupling the pressure chamber space to the flow channel, a first wall portion being an inner wall portion partitioning the pressure chamber space and coupling the first opening to the second opening, a first recess portion formed on the first wall portion and recessed in the first direction, and a first protruding portion formed on the first wall portion and protruding in a direction opposite to the first direction, the protruding portion being disposed between the first recess portion and the first opening in a direction from the second opening toward the first opening, the first protruding portion being closer to the second opening than a bottom of the first recess portion.

10. The liquid ejecting head according to claim 9, wherein at least one of a flow channel for introducing the liquid into the pressure chamber space and a flow channel for discharging the liquid from the pressure chamber space is formed in the flow channel substrate, and the at least one of the flow channels is coupled to the second opening.

11. The liquid ejecting head according to claim 9, wherein the nozzle is formed in the flow channel substrate, and the nozzle is coupled to the second opening.

12. The liquid ejecting head according to claim 9, wherein the pressure chamber substrate includes a second wall portion being an inner wall portion partitioning the pressure chamber space, coupling the first opening to the second opening and disposed on an opposite side of the pressure chamber space from the first wall portion in a plan view along the first direction, a second recess portion formed on the second wall portion and recessed in the first direction, and a second protruding portion formed on the second wall portion and protruding in the direction opposite to the first direction, the protruding portion being disposed between the second recess portion and the first opening in the direction from the second opening toward the first opening, the second protruding portion being closer to the second opening than a bottom of the second recess portion.

13. The liquid ejecting head according to claim 12, wherein the first wall portion includes a first inclined surface, the second wall portion includes a second inclined surface, the first recess portion and the first protruding portion are disposed on the first inclined surface, the second recess portion and the second protruding portion are disposed on the second inclined surface.

14. The liquid ejecting head according to claim 9, wherein the pressure chamber substrate further includes an introduction channel that is coupled to the first wall portion and introduces the liquid into the pressure chamber space, and the introduction channel is formed on the surface on the flow channel substrate side.

* * * * *